No. 716,451.  
E. P. MANTZ.  
ARTIFICIAL BAIT.  
(Application filed July 1, 1902.)  
Patented Dec. 23, 1902.
(No Model.)
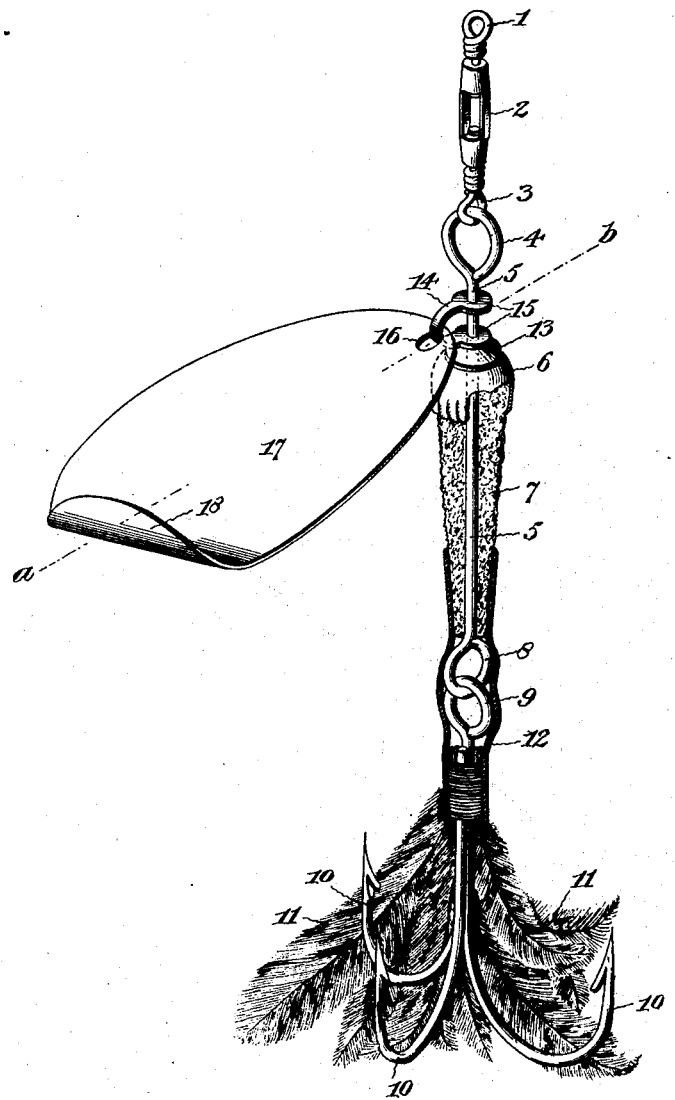

UNITED STATES PATENT OFFICE.

EMANUEL P. MANTZ, OF FREDERICK, MARYLAND.

ARTIFICIAL BAIT.

SPECIFICATION forming part of Letters Patent No. 716,451, dated December 23, 1902.

Application filed July 1, 1902. Serial No. 114,005. (No model.)

*To all whom it may concern:*

Be it known that I, EMANUEL PETER MANTZ, a citizen of the United States of America, residing at Frederick, in the county of Frederick and State of Maryland, have invented certain new and useful Improvements in Artificial Bait; and I do hereby declare the following to be a full, clear, and exact description of the invention, such as will enable others skilled in the art to which it appertains to make and use the same, reference being had to the accompanying drawing, and to figures of reference marked thereon, which forms a part of this specification.

My invention relates to artificial bait, and has for its object the improvement in its construction that will be hereinafter described, and particularly pointed out in the claims.

The accompanying drawing shows in elevation, partly in section, an artificial bait embodying my invention.

The line is attached to the eye 1 of the swivel 2, and the other eye 3 of the swivel is connected to the loop 4 of the main wire 5, which passes through the body of the bait. On the wire 5 is a metal cap 6, preferably, though not necessarily, hemispherical, whose edges are crimped to clench the larger end of the tapered colored felt body portion 7, formed around the wire 5. On the lower end of this wire, just beyond the end of the body 7, is another loop 8, and in this loop is secured the loop or eye 9 of the hooks 10. Below the eye 9 on the shanks of the hooks are secured the colored feathers 11. Covering the joint 8 9 is a rubber or other flexible tube 12, the object of which is to hold the hooks substantially in alinement with the body 7 during trolling, yet allowing a certain degree of motion, at the same time giving the hooks sufficient freedom of motion to be deflected sidewise should the fish nibble or touch it and allow it to be immediately brought back into alinement.

Between the cap 6 and the loop 4 on the wire 5 is a washer 13, preferably, though not necessarily, loose on the wire 5, and between this washer 13 and the loop 4 is a yoke 14, the wire 5 passing through perforations 15 in its arms. This yoke passes through a perforation 16 in a spoon 17, preferably, though not necessarily, colored on the under side and nickel-plated on the upper side and has a curled or turned-up portion 18. This curled or turned-up portion is at an angle or diagonal to the medial line $a\ b$ of the spoon.

I am aware that double-winged spoons with a curled edge have heretofore been made having propeller motion and rotatable about their centers; but by my structure the yoke 14 is capable of permitting the spoon to rotate freely around the wire 5 and at the same time allow the spoon when the bait is quiet to hang with its colored side close to the body 7, while during trolling the curled portion 18 will cause the spoon to revolve around the wire 5 and by reason of the perforations 16 allow the spoon at the same time to turn or wabble about its medial line, thus permitting the colored under side of the spoon to be flashed in different lateral directions during its revolution about the wire 5.

The yoke 14 may be omitted and the main wire pass directly through the perforations 16, that is made sufficiently large to allow the desired motion.

Having thus described my said invention, what I claim as new therein, and desire to secure by Letters Patent, is—

1. Artificial bait comprising a main wire, a body portion thereon and hooks hinged to the main wire at the end of the body portion, and a flexible tubular covering over said connection, substantially as described.

2. Artificial bait comprising a main wire, a tapered body portion thereon, a cap crimped on the larger end of said body portion, a yoke, said main wire passing through both of the arms of said yoke, a spoon having a perforation at one end through which said yoke passes, and a curled lower edge at an angle to the medial line of the spoon, hooks jointed to the main wire and flexible covering for the joint, substantially as described.

3. Artificial bait comprising a main wire, a body portion thereon, a hook or hooks hinged to the main wire at the end of the body portion, a flexible tubular covering over said connection and a spoon having a lower portion curled at an angle to its medial line connected to the main wire at one end and adapted to rotate about it and the body portion, substantially as and for the purposes set forth.

In testimony that I claim the foregoing as my invention I have signed my name in presence of two subscribing witnesses.

EMANUEL P. MANTZ.

Witnesses:
C. ALBERT GILSON,
WILBUR H. DUVALL.